(12) United States Patent
Routt et al.

(10) Patent No.: US 11,901,958 B2
(45) Date of Patent: Feb. 13, 2024

(54) QUANTUM SATELLITE-BASED GLOBAL NETWORKS

(71) Applicants: AT&T Intellectual Property I, L.P., Atlanta, GA (US); AT&T Mobility II LLC, Atlanta, GA (US)

(72) Inventors: Thomas J. Routt, Sequim, WA (US); Mark Stockert, San Antonio, TX (US); Slawomir Stawiarski, Carpentersville, IL (US)

(73) Assignees: AT&T Intellectual Property I, L.P., Atlanta, GA (US); AT&T Moblity II LLC, Atlanta, GA (US)

( * ) Notice: Subject to any disclaimer, the term of this patent is extended or adjusted under 35 U.S.C. 154(b) by 97 days.

(21) Appl. No.: 17/662,179

(22) Filed: May 5, 2022

(65) Prior Publication Data

US 2023/0361883 A1    Nov. 9, 2023

(51) Int. Cl.
*H04B 10/70*   (2013.01)
*G16Y 30/00*   (2020.01)
*G16Y 40/20*   (2020.01)
*G16Y 40/60*   (2020.01)
*G06N 20/00*   (2019.01)

(52) U.S. Cl.
CPC .............. *H04B 10/70* (2013.01); *G16Y 30/00* (2020.01); *G16Y 40/20* (2020.01); *G16Y 40/60* (2020.01); *G06N 20/00* (2019.01)

(58) Field of Classification Search
CPC ........ H04B 10/70; G16Y 30/00; G16Y 40/20; G16Y 40/60; G06N 20/00
USPC ........................................................ 398/140
See application file for complete search history.

(56) References Cited

U.S. PATENT DOCUMENTS

| | | |
|---|---|---|
| 7,451,292 B2 | 11/2008 | Routt |
| 8,190,553 B2 | 5/2012 | Routt |
| 10,244,581 B2 | 3/2019 | Routt |
| 10,660,157 B2 | 5/2020 | Routt |
| 10,827,561 B2 | 11/2020 | Routt |
| 11,509,599 B1 * | 11/2022 | Nijim .................. G06F 9/45558 |

(Continued)

OTHER PUBLICATIONS

Stockert et al., "System and Method for Managing Communication Networks with Quantum Blockchains," U.S. Appl. No. 17/498,229, 56 pages.

(Continued)

*Primary Examiner* — Mohammad R Sedighian
(74) *Attorney, Agent, or Firm* — Guntin & Gust, PLC; Matthew Tropper

(57) ABSTRACT

Quantum satellite-based global networks are provided. A system as provided herein includes a processor and a memory that stores first executable instructions that, when executed by the processor, facilitate performance of operations, the operations comprising receiving qubits from a quantum sensor device via a quantum communication channel established between the system and the quantum sensor device; providing quantum input data, derived from the qubits, to a quantum machine learning model; and adjusting a property of a communication network based on an output of the quantum machine learning model, produced in response to the providing of the quantum input data, resulting in an increased performance of a mobile application utilizing resources enabled via the communication network.

20 Claims, 12 Drawing Sheets

(56) References Cited

U.S. PATENT DOCUMENTS

2021/0022211 A1   1/2021  Routt
2022/0216924 A1*  7/2022  Rahman ................. G06N 10/00

OTHER PUBLICATIONS

Routt et al., "Quantum Artificial Intelligence and Machine Learning in a Next Generation Mobile Network," U.S. Appl. No. 17/498,248, 52 pages.
Grover, "Quantum Mechanics helps in searching for a needle in a haystack," Phys. Rev. Lett. 79, 325—Published Jul. 14, 1997, 4 pages.
Shor, "Polynomial-Time Algorithms for Prime Factorization and Discrete Logarithms on a Quantum Computer," SIAM Journal on Computing, vol. 26, No. 5, pp. 1484-1509, Oct. 1997, 26 pages.
Phillips et al., "Four Principles of Explainable Artificial 3 Intelligence," Draft NISTIR 8312, Aug. 2020, 30 pages.
Gunning et al., "DARPA's Explainable Artificial Intelligence Program," AI Magazine, vol. 40 No. 2: Summer 2019, 15 pages.

\* cited by examiner

QUANTUM SATELLITE-BASED GLOBAL NETWORKS

TECHNICAL FIELD

The present disclosure relates to communication networks, and, in particular, to techniques for facilitating satellite-based quantum communication.

BACKGROUND

Advancements in computing and networking technologies have led to increases in the amount of data that can be collected and processed as well as the ability to communicate such data globally. For example, global sectors such as public safety, business, government, and education can utilize highly-available satellite-based computing and network infrastructures to ensure timely end-to-end (ETE) access to strategic, tactical, operational, and/or other information assets. In particular, it is desirable to provide public safety first responders with highly-available, low-latency-access communication and network infrastructures as well as location-based situational awareness, e.g., to enable rapid response to the entire spectrum of routine, emergency, and disaster scenarios.

DETAILED DESCRIPTION

Various specific details of the disclosed embodiments are provided in the description below. One skilled in the art will recognize, however, that the techniques described herein can in some cases be practiced without one or more of the specific details, or with other methods, components, materials, etc. In other instances, well-known structures, materials, or operations are not shown or described in detail to avoid obscuring certain aspects.

In an aspect, a system as described herein can include a processor (e.g., a quantum or quantum-classical processor) and a memory that stores first executable instructions that, when executed by the processor, facilitate performance of operations. The operations can include receiving qubits from a quantum sensor device via a quantum communication channel established between the system and the quantum sensor device. The operations can further include providing quantum input data, derived from the qubits, to a quantum machine learning model. The operations can also include adjusting a property of a communication network based on an output of the quantum machine learning model, produced in response to the providing of the quantum input data, resulting in an increased performance of a mobile application utilizing resources enabled via the communication network.

In another aspect, a method as described herein can include receiving, by a system including a processor from a quantum sensor device via a photonic communication channel, a data stream comprising qubits. The method can additionally include providing, by the system to a quantum machine learning model, quantum input data based on the qubits. The method can further include facilitating, by the system, an adjustment of a property of a communication network based on an output of the quantum machine learning model, produced in response to the providing of the quantum input data, resulting in an increase in a performance metric associated with a mobile application enabled via the communication network.

In a further aspect, a non-transitory machine-readable medium as described herein can include first executable instructions that, when executed by a processor (e.g., a quantum or quantum-classical processor), facilitate performance of operations. The operations can include receiving, from a quantum sensor via a quantum communication channel, quantum sensor measurement data; deriving model input data from the quantum sensor measurement data; providing the model input data to a quantum machine learning model; and modifying a property of a communication network based on an output of the quantum machine learning model, produced in response to the model input data, where the modifying of the property of the communication network results in increased performance of a mobile application utilizing resources associated with the communication network.

Figure 1:
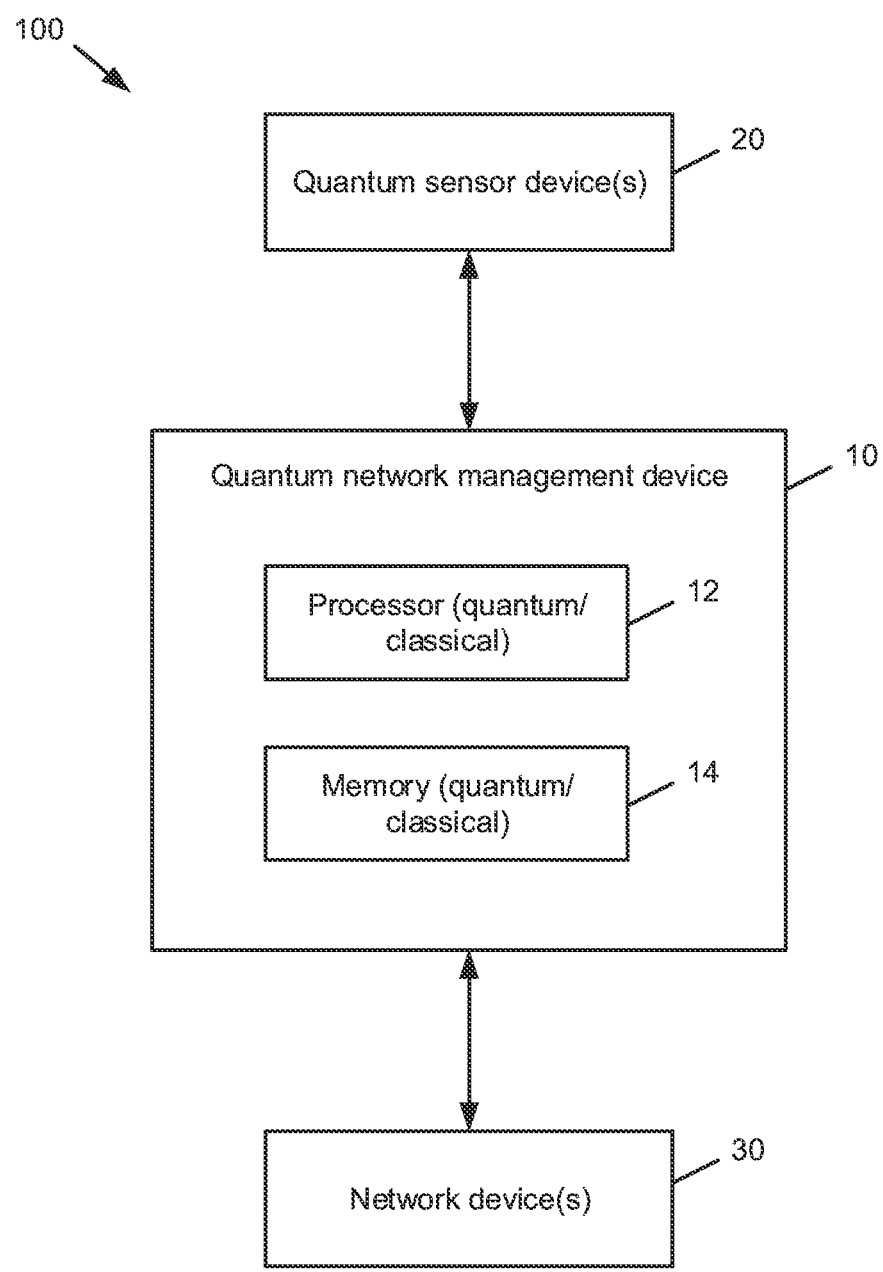
FIG. 1 is a block diagram of a system that facilitates quantum satellite-based global networks in accordance with various aspects described herein.

Referring first to FIG. 1, a system 100 that facilitates quantum satellite-based global networks is illustrated. System 100 as shown by FIG. 1 includes a quantum network management device 10 that can communicate with respective devices of associated communication networks. For instance, the quantum network management device 10 shown in FIG. 1 can communicate with respective quantum sensor devices 20, which can include and/or otherwise implement the functionality of quantum accelerometers, quantum gyroscopes, quantum interferometers, and/or other sensor devices capable of performing measurements via atom interferometry and/or similar techniques.

In an aspect, the quantum network management device 10 can communicate with the quantum sensor devices 20 via a communication network that supports quantum communication, such as a quantum communication network or a hybrid quantum/classical communication network. As used herein, a "quantum communication network" or "quantum communication channel" is a communication network or channel, respectively, in which data is communicated in the form of qubits (quantum bits), while a "classical communication network" refers to a communication network in which binary and/or otherwise non-quantum data is communicated, e.g., according to various networking techniques known in the art.

As further shown by FIG. 1, the quantum network management device 10 can further communicate with one or more network devices 30 via a quantum, quantum-classical, or classical communication network. In an aspect, the communication network(s) through which the quantum network management device 10 communicates with the quantum sensor devices 20 can be the same as, or different from, the communication network(s) used for communication between the quantum network management device 10 and the network devices 30. As will be described in further detail herein, the quantum network management device 10 can facilitate adjustment of properties of a communication network associated with the network devices 30, or applications used by the network devices 30 on such a communication network, to optimize and/or improve the performance of the network and/or applications running on the network.

While the quantum network management device 10 is illustrated in FIG. 1 as a single device, it is noted that the functionality of the quantum network management device 10 could also be distributed among multiple computing devices, e.g., devices of a distributed computing system and/or other suitable computing devices that are communicatively coupled via a suitable network. Accordingly, the term "quantum network management device" as described herein refers to any device and/or combination of devices that can perform the network management functions described herein. Additionally, the quantum network management device 10 can be implemented via space-based assets, such as satellites or the like, in addition to and/or in place of earth-based devices.

In another aspect, the quantum network management device 10 can include a processor 12 and a memory 14, which can be utilized to facilitate various functions of the quantum network management device 10. For instance, the memory 14 can include a non-transitory computer readable medium that contains computer executable instructions, and the processor 12 can execute instructions stored by the memory 14. For simplicity of explanation, various actions that can be performed via the processor 12 and the memory 14 of the quantum network management device 10 are shown and described below with respect to various logical components. In an aspect, the components described herein can be implemented in hardware, software, and/or a combination of hardware and software. For instance, a logical component as described herein can be implemented via instructions stored on the memory 14 and executed by the processor 12. Other implementations of various logical components could also be used, as will be described in further detail where applicable.

As further shown in FIG. 1, the processor 12 and memory 14 can utilize a quantum architecture or a hybrid quantum/classical architecture, e.g., such that the processor 12 and memory 14 are capable of performing quantum computing operations. An example computing environment that can be utilized for quantum and/or quantum-classical computing operations is described in further detail below with respect to FIG. 3. Additionally, an example computing environment that can be utilized for classical computing operations is described in further detail below with respect to FIG. 12.

As noted above, the quantum network management device 10 and/or respective quantum sensor devices 20 can be implemented via satellite-based computing and network infrastructures, which can in turn be based on Geosynchronous/Geostationary Orbit (GEO), Medium Earth Orbit (MEO), and/or Low Earth Orbit (LEO) space-based assets.

GEO-supported technologies include weather and communication (e.g., mobile data, telephony, television, radio, etc.) satellites that are generally positioned approximately 35,786 km, or 22,236 miles, above the equatorial plane, and orbit in an easterly direction at the same angular speed as the rotation of the earth such that they appear to be fixed in the sky. For instance, satellites in circular geosynchronous orbits are generally positioned directly above the equator (e.g., with eccentricity and inclination at zero) and revolve in geostationary orbits that do not move relative to a ground-based inertial observer.

GEO and/or other satellites can communicate via radio frequency (RF) signals, which propagate at approximately the speed of light, e.g., 300 k km/sec or 186 k miles/sec. As a result, RF signals can generate single up/down hop delay in an equatorial plane of approximately 240 ms, as well as approximately 280 ms of one-way delay based on latitudinal offset of earth stations and/or teleports. Additional GEO satellite delays can be introduced due to terrestrial circuit delays at the transmitter and/or receiver as well as any additional satellite hops. The addition of data centers, servers, switches, routers, and associated call/data flows along the path can contribute to an ETE round trip time (RTT) latency of approximately 700-800 ms, based on propagation delay as described above, terrestrial circuit delays, and/or router/switch/signal/buffering processing delays.

MEO satellites include navigational and specialty orbits, which are designed to monitor specific regions of interest. MEO satellites can occupy a semi-synchronous orbit at altitudes of approximately 19,100 km (11,900 miles) to 23,222 km (14,429 miles) and can be utilized, e.g., by Glonass, BeiDou, Molniya, Galileo, and/or Global Positioning System (GPS) constellations. As examples, MEO orbits can include semi-synchronous orbits (e.g., as utilized by GPS constellations) and Molniya orbits (e.g., for observing high latitudes).

LEO satellites include scientific and communications satellites occupying orbits that generally range from approximate altitudes of 160 km (99 mi) to 2,000 km (1,242 mi), which can reduce latency and increase throughput relative to GEO orbits as described above. In an aspect, LEO satellites can be used to support small cells, incorporating, e.g., Fifth Generation (5G) Sub-6 Midband and Lowband, Highband millimeter wave (mmWave), or the like. The orbital period of a LEO satellite can be approximately 128 minutes.

Additionally, 5G mobile network deployments, driven by data-intensive business models and specifications to support extreme mobility and hyper-connectivity, are rapidly proliferating throughout the world and deliver a wide range of capabilities relative to prior generations. For example, 5G networks can facilitate Enhanced Mobile Broadband (eMBB) with maximum data rates up to 20 Gbps; Ultra-reliable Low Latency Communication (URLLC) with latency as low as 1 ms, high availability and high reliability; and massive Machine Type Communication (mMTC) with connection densities as high as one million per square kilometer as well as extended device battery life over wide coverage areas.

In addition to 5G mobile networks, future mobile network technologies, such as Sixth Generation (6G), are also being developed. Proposed features of 6G networks include, but are not limited to, the following: on-demand topology; three-dimensional connectivity; integration of communications and sensing technologies; ultra-high-speed, high-capacity, low-latency connectivity; space-air-ground integrated networking (SAGIN); advanced network virtualization; pervasive on-demand artificial intelligence (AI); and pervasive multi-dimensional locational services and situational awareness.

As quantum computing technology advances, terrestrial- and satellite-based 5G, 6G, and/or other next-generation mobile networks will increasingly utilize quantum and hybrid quantum-classical communications to facilitate connecting a plurality of ETE quantum and hybrid quantum-classical networked application resources, such as application programs, application programming interfaces (APIs), application servers, security servers, data repositories/lakes, routers, switches, load balancers, links, etc.

Quantum data, generated by quantum and hybrid quantum-classical computational runtime environments, are characterized by quantum superposition and quantum entanglement. Additionally, quantum data yield n-dimensional probability distributions that utilize exponential compute resources to process, represent, store, and connect. The presence of quantum/hybrid quantum-classical ETE networked application resources can, in turn, exponentiate the incorporation of technologies such as a quantum positioning system (QPS), quantum artificial intelligence (QAI), quantum machine learning (QML), quantum deep learning (QDL), quantum reinforcement learning (QRL), and quantum blockchains, among others, within 6G mobile and fixed communications networks.

Quantum computing and quantum networking have assumed strategic importance due to the following:
(1) Continuing cost-performance improvements in classical (non-quantum) processor memory, speed, and very large-scale integration (VLSI) substrate density packing are not sustainable due to quantum effects that pervade the quantum scales at which electronic, photonic, opto-electric processors, devices, and network components are fabricated and process data.
(2) Worldwide quantity of data volume (scale), variety (form, e.g., structured or unstructured), velocity (streaming) and veracity (uncertainty) is rapidly increasing due to exponential improvements in computing, storage, cloud, and mobility network economies of scale and specialization.

Additionally, while the Internet and World Wide Web have changed how the world communicates, advances in data processing, known colloquially as "Big Data," have transformed how information itself is processed in the following ways:
(1) Previous reliance upon collecting and using relatively small sample sizes has shifted to emphasis on collecting and storing vast quantities of information in cloud-based data lakes/repositories.
(2) Highly curated data are desirably provided against exponential increases in available information.

Quantum computation stores information as quantum bits (qubits), which are quantum generalizations of classical bits. Qubits can be represented as a two-to-n-level quantum system based on, e.g., electronic/photonic spin and polarization, where:
(1) the state of a qubit is a phase vector $|\Psi\rangle$, which is a mathematical description of a quantum system having a complex-valued probability amplitude and the probabilities for possible results of measurements made on the system, in a linear superposition of states, e.g., $|\Psi\rangle = \alpha|0\rangle + \beta|1\rangle$;
(2) state vectors $|0\rangle$ and $|1\rangle$ are physical eigenstates of the logical observable and form a computational basis spanning a two-to-n dimensional Hilbert space—the inner product space of two or more vectors, equal to the vector inner product between two or more matrix representations of those vectors—containing $|\Psi\rangle$; and
(3) where a collection of qubits comprises a multi-particle quantum system.

Quantum computation can pursue all computational trajectories simultaneously based on quantum superposition, whereas classical computation proceeds in serial fashion. Quantum logic gates form basic quantum circuits that operate on qubits, are reversible with a few exceptions (unlike classical logic gates), and are unitary operators, described as unitary matrices relative to basis states.

Quantum computational speedup relative to classical (non-quantum) computing and/or networking derives in part from invocation of quantum processing algorithms. Quantum algorithms utilize quantum circuit gates to manipulate states of quantum systems just as classical algorithms utilize classical logical gates (represented as a sequence of Boolean gates) to perform classical (non-quantum) computational operations. Emerging quantum networks, in turn, are based on quantum communication channels that transmit qubits between physically distinct quantum or hybrid quantum-classical processors that are able to perform quantum logic operations on qubits.

Global space-based initiatives have both intensified and diversified during the past several years based on rapid improvements in launch, recovery, and communication technologies; significant business model and paradigm shifts to increasing commercial development that reflects service-driven R&D in addition to traditional government-sponsored missions; and to the launch of increasingly cost-effective satellite "mega-constellation" programs. Quantum technologies and space domains have each emerged as strategically-, tactically-, and operationally-significant sectors based on initial successes of satellite missions carrying quantum technology payloads directed, e.g., to positioning systems, timing, navigation, and satellite gravimetry.

With specific reference to the field of public safety, first responders often rely on highly-available, low-latency-access communications and network infrastructures as well as location-based situational awareness, enabling the public safety community to respond to the entire spectrum of routine, emergency, and disaster emergency scenarios—both natural and manmade—at a moment's notice. Rapid, real-time data collection and actionable analytics based on those data are equally central to enable first responders to conduct immediate, properly-directed responses.

Most disasters occur without warning, and all require a rapid and flawless response with no room for error. Timely, multi-disciplinary, coordinated responses across agency lines is highly desirable to protect the communities and citizens that first responders are charged to serve. Whether the event is a fire, natural disaster (e.g., hurricane, earthquake, forest fire, flood, commercial disaster, etc.), vehicular collision, search and rescue operation, apprehension of suspects, or the like, highly-available, low access-latency networks, real-time data collection, real-time three-dimensional (3D) location-based situational awareness, and actionable analytics provide the common denominator to successful first-responder rapid response.

During public safety incidents, first responders, public safety entities (PSEs), and public safety agencies (PSAs) alike are tasked with continual tracking and intercommunication to ensure a coordinated incident response. Location of first responders is of particular significance, including, e.g., while in vehicles, on a foot chase, involved in search-and-rescue operations, fighting wildfires, restoring communications in the wake of a flood or earthquake, or inside a high-rise building responding to an incident.

By implementing various embodiments as described herein, the performance of a wireless communication network (e.g., FirstNet, etc.), and/or applications running on a wireless communication network, can be improved by increasing the precision with which measurements can be performed and communicated within the network. Additionally, various embodiments as described herein can enable quantum satellite capabilities and quantum-classical actionable data analytics across a wide range of public safety and enterprise sectors, e.g., by facilitating the ability of a system to capture, process, analyze, curate, store, search, and/or re-purpose metadata, mobile application data, mobile device data, geo-location data, key performance indicator (KPI) data, release-fit data, or the like, as applied to various public safety and enterprise use cases. Other advantages are also possible.

Figure 2:
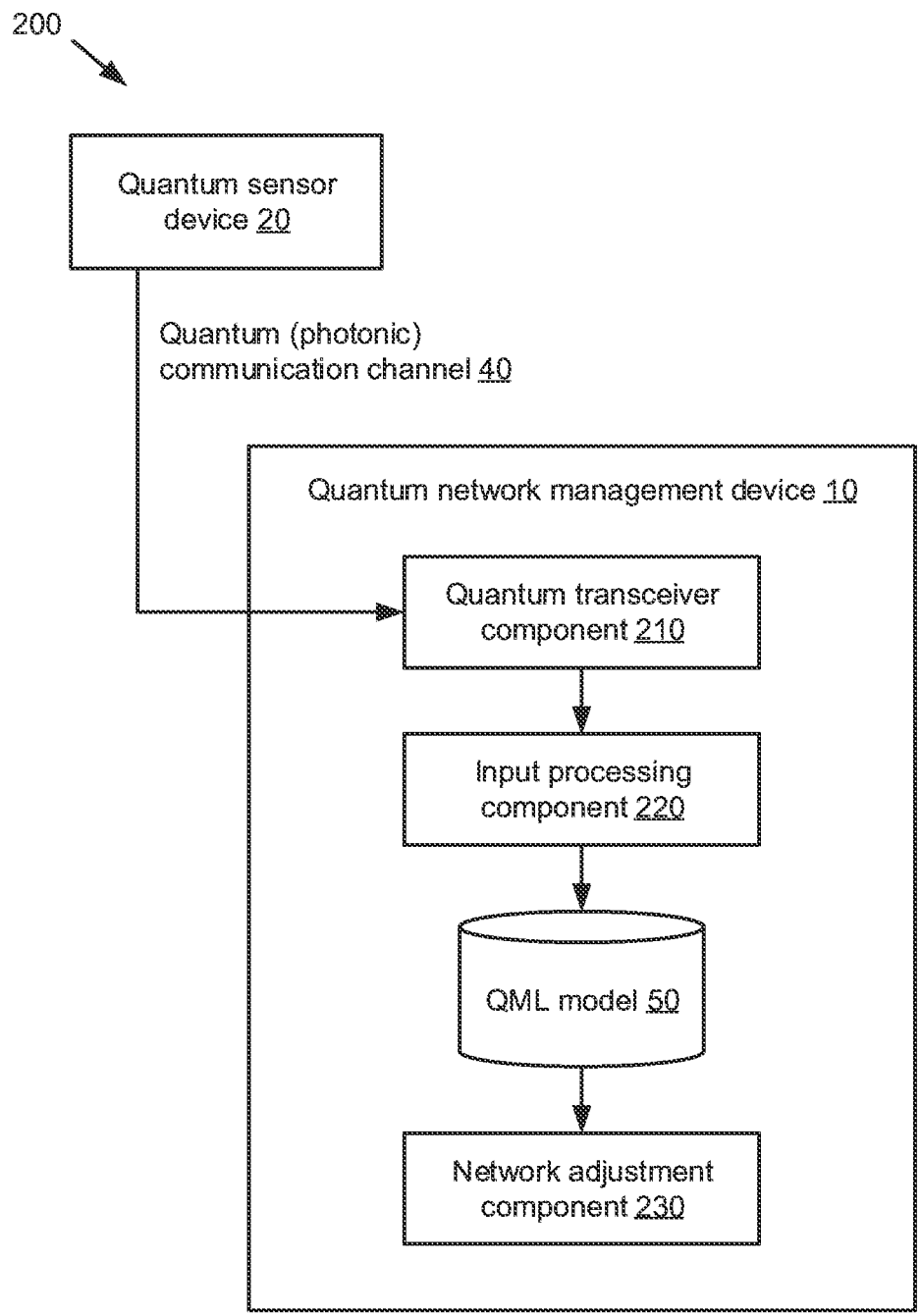
FIG. 2 is a block diagram that depicts the functionality of the quantum network management device of FIG. 1 in further detail in accordance with various aspects described herein.

With reference now to FIG. 2, a block diagram of a system 200 that facilitates quantum satellite-based global networks is illustrated. Repetitive description of like elements employed in other embodiments described herein is omitted for sake of brevity. System 200 as shown in FIG. 2 includes a quantum network management device 10 that can operate in a similar manner to that described above with respect to FIG. 1. As further shown in FIG. 2, the quantum network management device 10 includes a quantum transceiver component 210 that can receive a stream of quantum data, e.g., expressed as qubits, from a quantum sensor device 20 via a quantum communication channel 40 established between the quantum network management device 10 and the quantum sensor device 20. As used herein, a quantum communication channel is also referred to as a photonic communication channel.

In an aspect, a quantum or photonic communication channel 40 from which the quantum transceiver component 210 receives data from the quantum sensor device 20 can utilize channel features and/or processing techniques such as quantum channel encoding, quantum error detection, or similar techniques to increase the performance of the quantum communication channel 40, e.g., with respect to error rate, throughput, or the like. Additionally, qubits received by the quantum transceiver component 210 via the quantum communication channel 40 can correspond to, e.g., measurement data produced by the quantum sensor device 20 and/or any other suitable quantum data. Additionally, the quantum sensor device 20 can be associated with any suitable space-based asset, such as satellites or other objects traveling in a geocentric orbit (e.g., GEO, MEO, LEO, etc.), and/or any suitable earth-based (terrestrial) asset.

The quantum network management device 10 shown in FIG. 2 further includes an input processing component 220 that can provide quantum input data, e.g., input data derived from qubits received via the quantum transceiver component 210, to a Quantum Machine Learning (QML) model 50. In an implementation, the input processing component 220 can derive the quantum input data from the received qubits, e.g., by performing respective quantum logic operations on the received qubits. Alternatively, the quantum input data can be produced via other suitable components or functions.

In an aspect, the QML model 50 can produce output data, e.g., quantum output data, in response to the input processing component 220 providing the QML model 50 with quantum input data as described above. Subsequently, the quantum network management device 10 can adjust, or facilitate adjustment of, a property of an associated communication network (e.g., a communication network on which the network devices 30 shown in FIG. 1 operate) via a network adjustment component 230. As a result of the modifications and/or adjustments performed by the network adjustment component 230, the performance of a mobile application that utilizes resources provided via the communication network, and/or is otherwise enabled by the communication network, can be increased, e.g., according to one or more performance metrics (e.g., throughput, latency, error rate, etc.).

In an aspect, the quantum network management device 10 shown in FIG. 2 can provide enhanced mobile and non-mobile application services, multi-dimensional location services and situational awareness, and highly-integrated communications and sensing technologies on behalf of global public safety and enterprise sectors operating within quantum and/or hybrid quantum-classical satellite-based 5G, 6G, or other next-generation mobile networks. The quantum network management device 10 shown in FIG. 2 can operate within a quantum and/or hybrid quantum-classical satellite-based free-space propagation communications network that incorporates quantum and classical sources, relaying nodes, and communication channels between and among a plurality of ground-to-satellite, satellite-to-ground, and satellite-to-satellite connections.

Ground- and satellite-based communications sources and/or receivers used in the above manner can contain respective quantum communications payloads, which can in turn include space environment-hardened quantum-entangled photon sources/receivers, polarization detection modules, and/or other suitable components. In an aspect, respective quantum entangled ground-to-space, space-to-space, and/or ground-to-ground photon pair polarizations (e.g., linear horizontal, linear diagonal, linear antidiagonal, linear vertical, right-handed circular, and/or left-handed circular) can be enabled, e.g., based on Bell state [also referred to as Einstein, Podolsky, Rosen (EPR) pairs] and two-qubit state-based quantum teleportation and superdense coding, where measurement outcomes are correlated and extensible to n-qubit systems.

Figure 3:
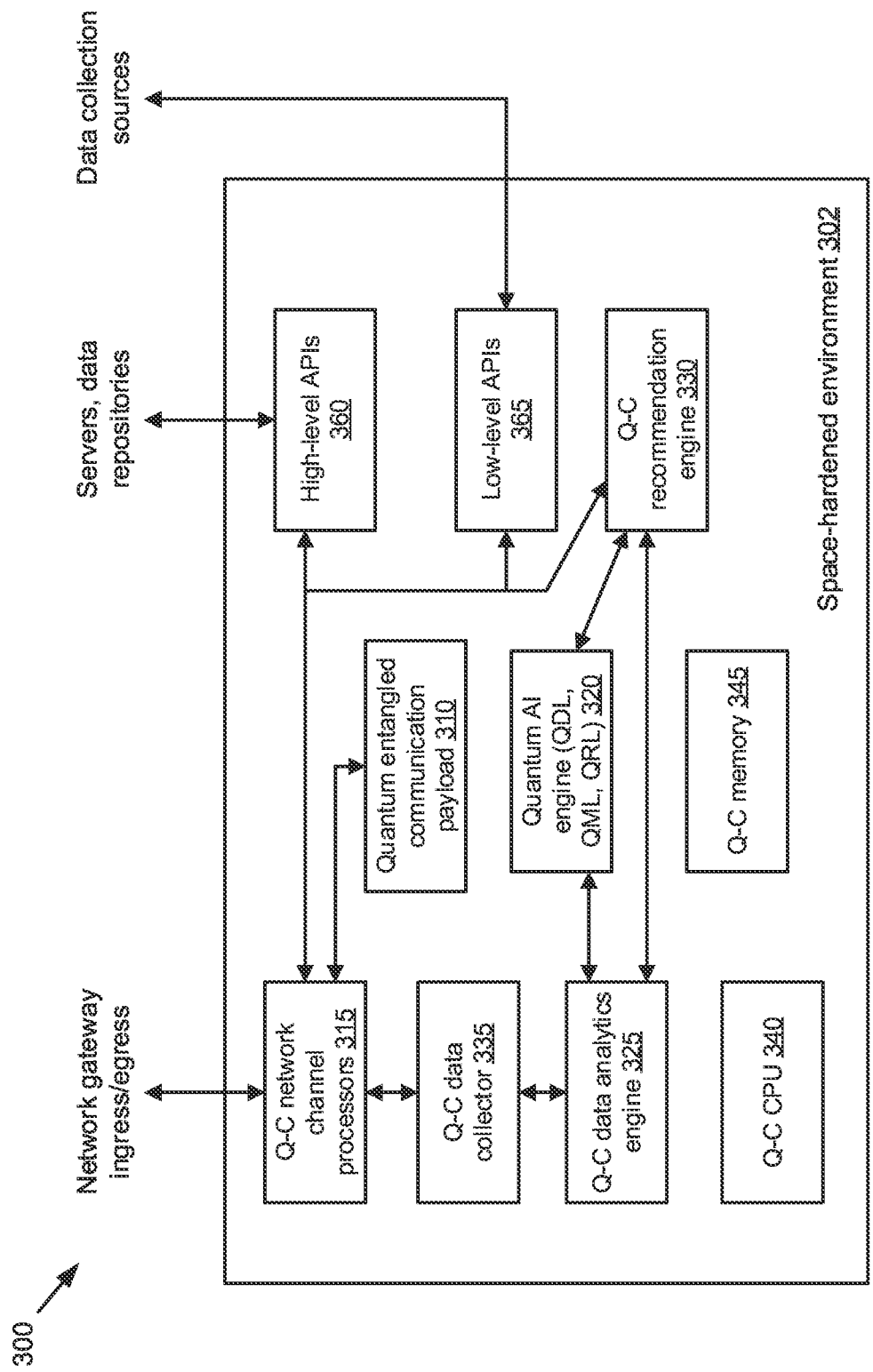
FIG. 3 is a block diagram of a space-based quantum-classical computing and network environment in which various aspects described herein can function.

Turning now to FIG. 3, a functional diagram 300 of an example satellite-based quantum-classical computational and network processing environment, also referred to herein as a quantum satellite (QSAT) environment, is illustrated. The QSAT environment shown by diagram 300 is housed within a space-hardened environment 302 that provides protection against radiation, extreme temperatures, and/or other conditions associated with outer space. Additionally, the space-hardened environment 302 can be a vacuum-based, super-cold environment that enables qubit-based quantum computation and network processing to proceed with minimal energy expenditure. In an aspect, respective QSAT platforms, such as that shown by diagram 300, can participate in space-based quantum-entangled processing as non-terrestrial compute/network nodes that also participate within a plurality of earth-based compute/network nodes.

As shown in diagram 300, the QSAT environment can include a quantum entangled communication payload 310, which can incorporate respective entangled and polarized photon pairs having interfaces to respective quantum-classical network channel processors 315. For simplicity of illustration, "quantum-classical" is abbreviated in diagram 300 as Q-C. As used herein, the term "quantum-classical" refers to a hybrid architecture that can perform operations on both quantum data and classical data. In an aspect, quantum and classical data can be handled by quantum-classical components separately, e.g., by utilizing dedicated data pipelines or channels for each type of data. A channel utilized for quantum data in this manner can be referred to as a quantum or photonic channel, while a channel utilized for classical data can be referred to as a classical or non-photonic channel. Alternatively, quantum-classical components could perform some operations involving both quantum and classical data, e.g., to generate classical approximations of quantum states and/or other operations.

As further shown in diagram 300, the QSAT environment can include a Quantum Artificial Intelligence (QAI) engine 320, which can incorporate Quantum Deep Learning (QDL), QML, Quantum Reinforcement Learning (QRL), and/or other appropriate logic. As further shown by diagram 300, the QAI engine can interface with a quantum-classical data analytics engine 325 and a quantum-classical recommendation engine 330.

The QSAT environment shown in diagram 300 also includes a quantum-classical data collector 335, which can be used, e.g., to capture relevant data traffic between and/or among public safety first responders, enterprise entities, and/or other suitable entities using mobile and/or non-mobile applications. In this way, the quantum-classical data collector 335 can provide a central point of continuous, event-driven and/or query-driven data acquisition and delivery models on behalf of respective mobile and/or non-mobile applications.

The quantum-classical data analytics engine 325 shown in diagram 300 can generate actionable descriptive, diagnostic, predictive, and/or prescriptive analytics directed to optimizing application performance with respect to performance metrics such as access latency, response time, throughput, network availability, ETE application connectivity, or the like. The quantum-classical data collector 335 can generate such analytics for respective applications, such as data, video, graphics, voice, and/or text applications directed to the public safety, enterprise, and/or other sectors. As further shown by diagram 300, the QSAT environment can also include a quantum-classical central processing unit (CPU) 340 and quantum-classical memory 345 to facilitate operation of the respective other components shown in the environment.

As additionally shown by diagram 300, the QSAT environment can include respective high-level APIs (HLAPIs) 360 and low-level APIs (LLAPIs) 365 that can interact with respective data sources. Example functional relationships that can be established between the HLAPIs 360 and LLAPIs 365 are illustrated by diagram 400 in FIG. 4. As shown in diagram 400, the HLAPIs 360 and LLAPIs 365 can provide direct access to various servers, data repositories, and data collection sources. As additionally shown by diagram 300, network gateway ingress and egress can be provided via the quantum-classical network channel processors 315.

Figure 5:
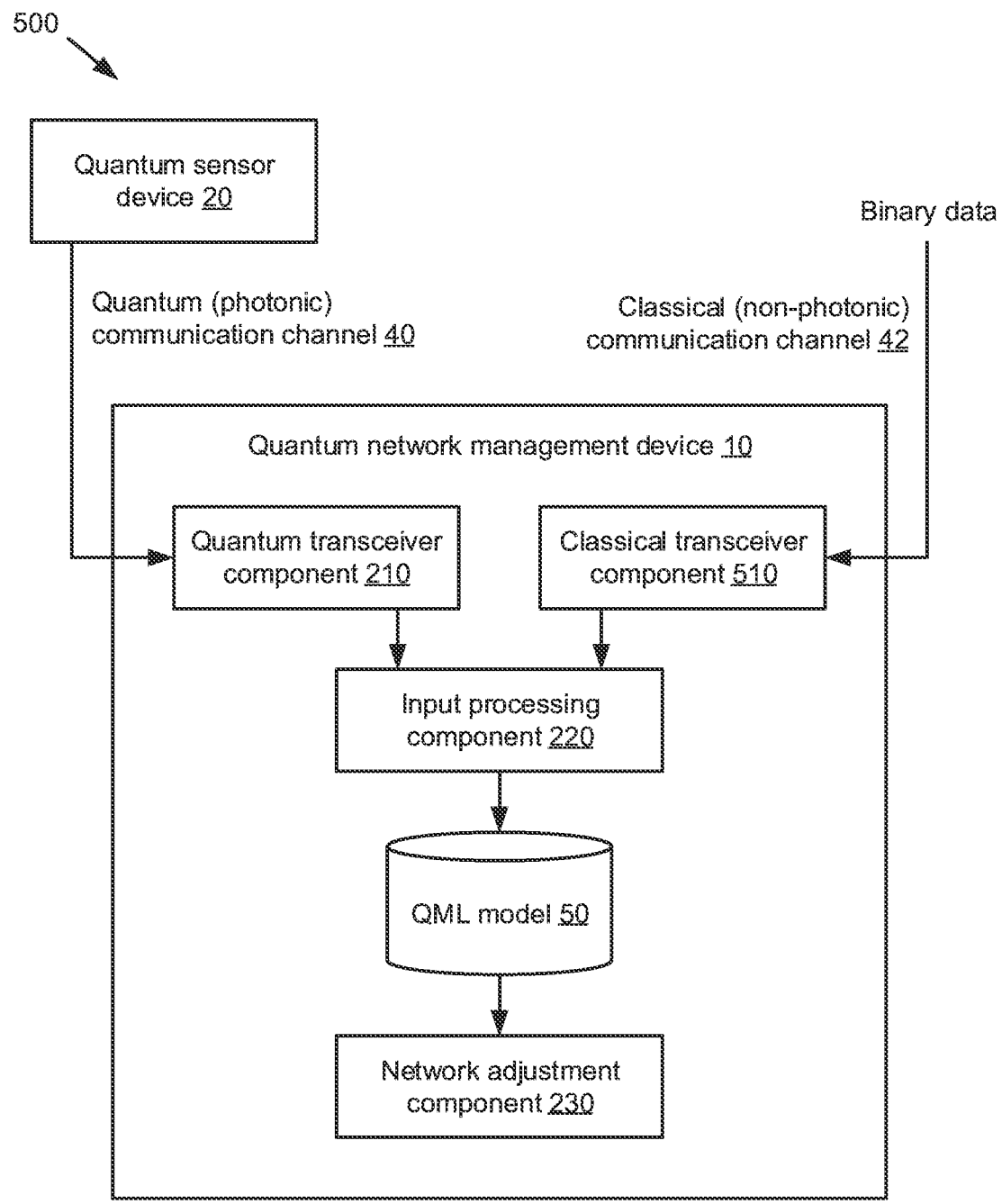
FIG. 5 is a block diagram that depicts further functionality of the quantum network management device of FIG. 1 in further detail in accordance with various aspects described herein.

With reference next to FIG. 5, a block diagram of a further system 500 that facilitates quantum satellite-based global networks is illustrated. Repetitive description of like elements employed in other embodiments described herein is omitted for sake of brevity. As shown in FIG. 5, a quantum transceiver component 210 of a quantum network management device 10 can receive data from a quantum sensor device 20 via a quantum (photonic) communication channel 40, e.g., as described above with respect to FIG. 2. As further shown in FIG. 5, the quantum network management device 10 can further include a classical transceiver component 510 that can receive a supplemental stream of classical data, e.g., binary data, via a classical or non-photonic communication channel 42 that is distinct from the quantum communication channel 40. As further shown in FIG. 5, the classical transceiver component 510 can provide received binary data to an input processing component 220, e.g., to facilitate generation of quantum input data for a QML model 50 based on qubits received by the quantum transceiver component 210 and binary data received by the classical transceiver component 510.

While the quantum transceiver component 210 and the classical transceiver component 510 are illustrated in FIG. 5 as separate components, it is noted that the functionality of these components could also be implemented via a single component, e.g., a hybrid quantum-classical transceiver component, that provides interfaces to both the quantum communication channel 40 and the classical communication channel 42. Additionally, while a single input processing component 220 is shown in FIG. 5 that processes both quantum and classical data, it is noted that separate processing components could be used for quantum and classical data, which could then in turn provide respective processed input data to the QML model 50.

In an aspect, the quantum network management device 10 shown in FIGS. 2 and 5 can be implemented as part of a communication network that is established between and/or among a group of space-based and/or earth-based assets and includes one or more quantum communication channels, e.g., the quantum communication channel 40. The space-based and/or earth-based assets of the communication network could, in turn, each implement some or all of the functionality of the quantum network management device 10, a quantum sensor device 20, and/or other suitable devices. Respective devices in the network can include quantum computing and communication infrastructure, e.g., as implemented via quantum processors or hybrid quantum-classical processors with associated memory. This quantum computing and communication infrastructure can enable respective devices in the network to transmit and/or receive qubits across respective quantum communication channels between respective distinct quantum-capable processors (e.g., processors associated with different network devices, etc.), where the quantum communication channels utilize quantum channel encoding and/or quantum error detection. The above-described quantum computing and communication infrastructure can further perform quantum logic operations on the transmitted qubits as well as utilize ETE quantum and/or hybrid quantum-classical networked application resources to implement QAI and/or QML functions.

Figure 6:
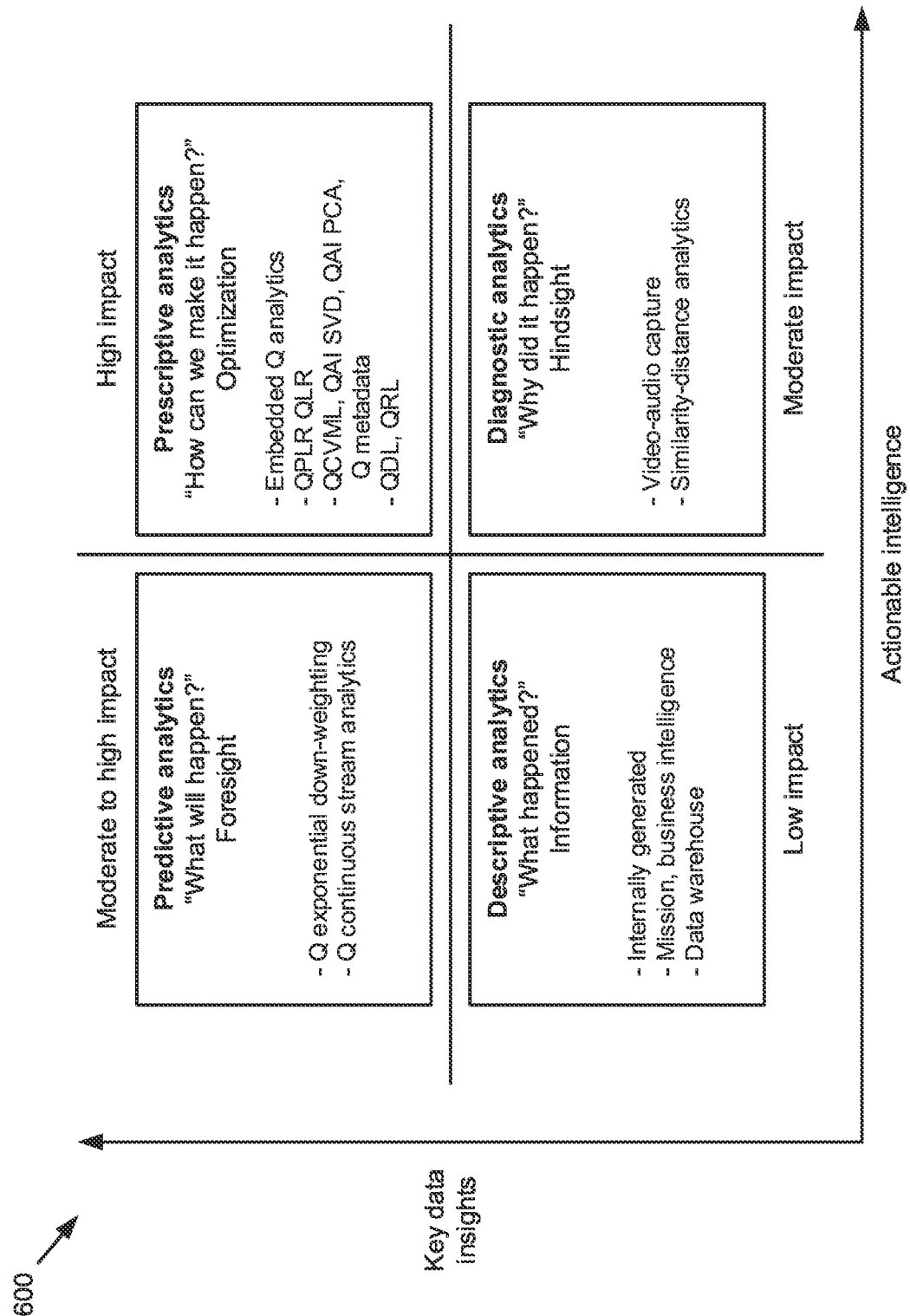
FIG. 6 is a diagram depicting an example quantum data science model that can be utilized in accordance with various aspects described herein.

Referring now to FIG. 6, diagram 600 depicts an example quantum data science model that can be utilized to perform QAI-driven data analytics on data collected via a QSAT platform, e.g., the QSAT environment shown in FIG. 3. The model shown by diagram 600 is divided into four quadrants, where the vertical axis illustrates a continuum for actionable intelligence and the vertical axis illustrates a continuum for key actionable data insights. As further shown by diagram 600, each quadrant of the model is directed to different types of data analytics and are associated with respective analytical functions. It is noted, however, that the analytical functions shown in diagram 600 and described herein are merely examples of functions that could be performed and that other functions are also possible.

The lower left quadrant of diagram 600 represents example descriptive analytics functionality. Generally, descriptive analytics are based on past events and utilize data corresponding to, e.g., internally-generated reports derived from previously collected data and/or other mission or business intelligence. As descriptive analytics are based on past events, descriptive analytical functions are generally directed to the question of "what happened."

The lower right quadrant of diagram 600 illustrates an example diagnostic analytics function. As shown, a diagnostic analytical function can include, e.g., analysis of video and/or audio data captured during one or more events. As further shown, a diagnostic analytical function can further include similarity-distance analytics, which is defined as the similarity, or "closeness," of two or more events. In an aspect, similarity-distance analytics can incorporate references to other, similar events that occurred in the past to enable correlation of previous diagnostics with current event diagnostic analysis. In doing so, a basis can be provided for hindsight-enabled data analytics into reasons and/or causes for current event occurrences.

The upper left quadrant of diagram 600 illustrates example predictive analytical functions, which can be configured to predict what will happen in the future based on accumulated historical data, e.g., as informed by a QSAT environment and/or terrestrial QAI, QDL, QML, and/or QRL functions. As shown in diagram 600, predictive analytical functions can include quantum (Q) exponential down-weighting, which can compress quantum or quantum-classical data into a single value that can be updated without saving an entire underlying dataset. In an aspect, more recently received data can be weighted more highly than earlier-received data, e.g., to account for data that may decay over time. Quantum exponential down-weighting can be performed using any suitable technique, such as by performing a running weighted average in which newer data is weighted more heavily than older data.

As further shown in diagram 600, the predictive analytical functions can further include a quantum continuous analytics function, which can provide a foundation for rapid adaptive actions based on complex event processing and continuous calculation of statistical analytics while monitoring live streaming data. This can, for example, enable quantum-classical data to be processed before landing on a database, data repository, or the like.

Figure 4:
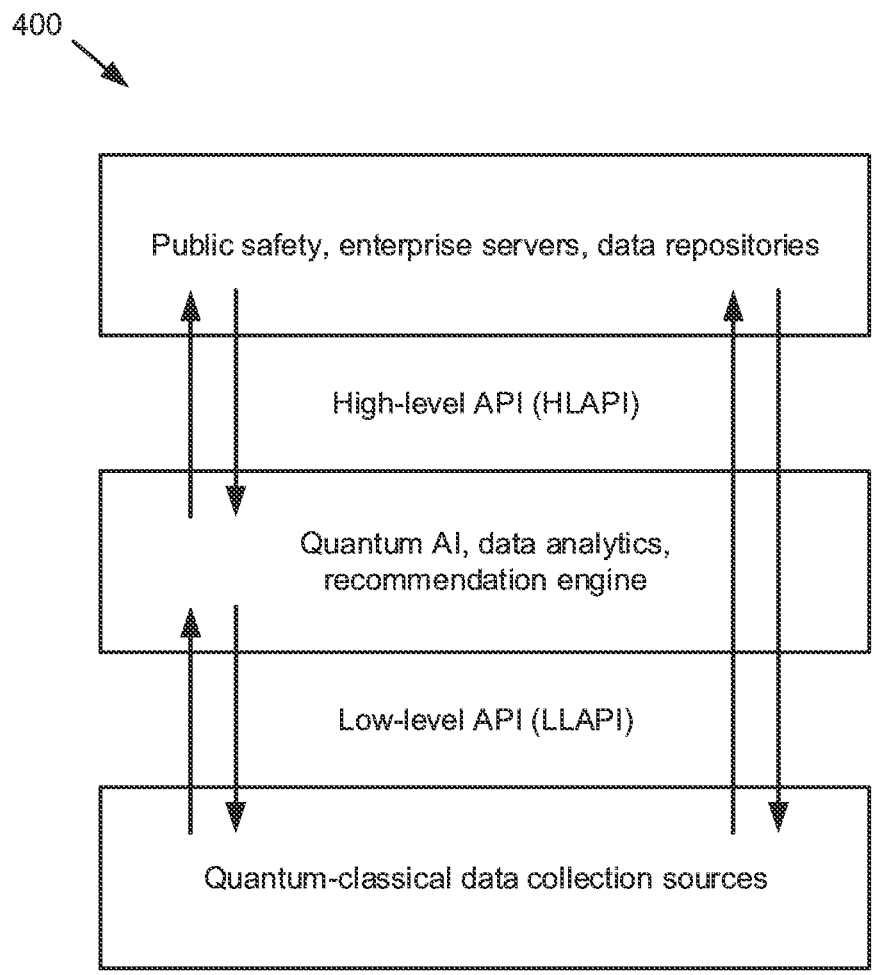
FIG. 4 is a diagram depicting an example application programming interface (API) environment that can be utilized in accordance with various aspects described herein.

The upper right quadrant of diagram 600 illustrates example prescriptive analytical functions, which can be used to optimize future outcomes, e.g., with respect to public safety, enterprise, infrastructure, finance, education, government, and/or other sectors. By way of example, one or more prescriptive analytical functions shown in diagram 600 can be performed on the output of a QML model, such as the QML model 50 shown in FIGS. 2 and 4, to generate recommendation data. The recommendation data, in turn, can be provided to elements of a communication network, e.g., elements associated with one or more of the sectors listed above, via an API (e.g., HLAPIs 360 and/or LLAPIs 365 as shown in FIGS. 3-4).

The prescriptive analytical functions shown in diagram 600 include embedded quantum analytics, in which analytic functions are integrated within operational processes to improve their efficiency. Further shown is quantum predictive linear regression (QPLR), in which outcomes are predicted based on a change of numeric and/or categorical input variables. The prescriptive analytical functions further include quantum logistic regression (QLR), in which binary outcomes are predicted based on an analysis of input variables, where a probability is predicted that an instance belongs to a specific category. This can be used, e.g., to determine a probability that a forecasted event will create a specific outcome.

The illustrated prescriptive analytical functions additionally include quantum continuous variable machine learning (QCVML), which can include QAI singular value decomposition (SVD), QAI principal component analysis (PCA), and/or quantum metadata. QAI SVD can be utilized to order columns of singular values via a base change operation, e.g., by placing columns in decreasing order of their corresponding values. Quantum Artificial Intelligence Principal Component Analysis (QAI PCA) can be used to optimize the discrepancy between an actual value X and an approximation to X via orthogonal columns U and V, e.g., as measured via squared error. In an aspect, QAI PCA can be connected with back propagation. Quantum metadata includes data about quantum-classical data, e.g., descriptive, structural, administrative, reference, and/or statistical metadata.

The prescriptive analytical functions shown in diagram 600 further include QDL and QRL, which can use a neural network model that can be extensible to deep convolutional neural networks (DCNN). QDL and/or QRL can utilize a multi-layered structure, convolution, max pooling, nonlinear dynamical nodes, back propagation, and/or other features.

In an aspect, one or more QAI elements incorporating QDL, QML, QRL, and/or other components, e.g., QAI elements associated with the QAI engine 320 shown in FIG. 3 and/or prescriptive analytical functions as shown in FIG. 6, can store and access respective records and "learn" from interaction with space- and terrestrial-based Internet of Things (IoT) sensors to optimize network access latency, network throughput, and/or network capacity on behalf of public safety mobile applications and/or other suitable applications. In another aspect, one or more QAI elements incorporating QDL, QML, QRL, and/or other components can store, access, and "learn" from respective public safety operational mission data, archived public safety event response records, quantum KPIs (QKPIs), and/or other information to generate predictive alerts and facilitate real-time prescriptive alert conditions and proactive ETE space-based and terrestrial network optimization.

In some implementations, space-based atomic clocks can be used to provide a terrestrially-independent means of timekeeping via quantum entanglement-based synchronization of relative times and frequency synchronizations between and/or among respective devices. For instance, time and/or frequency synchronization can be maintained between space- and earth-based quantum clocks, quantum gyroscopes, quantum accelerometers, quantum positioning systems, or the like, to generate and inform relative and absolute position and velocity. Additionally, space-based time standards and frequency transfer (TFT) can incorporate optical quantum atomic clocks and optical frequency transfer. This system, employed in concert with a hybrid space-/earth-based QPS, can enable quantum clock synchronization derived from quantum entanglement of pairs of quantum nodes incorporating synchronized quantum clocks, and among a plurality of quantum network time protocol (QNTP)-based Stratum servers. This can, in turn, enable QSAT-terrestrial quantum network clocking precision that can meet or exceed the standard quantum limit (SQL) to temporally govern generation, transmission, transduction, interfacing, storage, processing, and/or measurement of optical qubits.

In an aspect, a logically associated space- and earth-based time and frequency quantum positioning system (TFT/QPS)

implementation can incorporate 3D QAI-based location and situational awareness, e.g., via interrogation of X-Y (two-dimensional or 2D) and Z (altitude) axes utilizing entangled quantum gyroscopes, quantum interferometers, quantum accelerometers, or the like. This can facilitate, for example, ground-based indoor and/or outdoor navigation and way-finding for public safety first responders and/or other users, which can reduce reliance upon classical GPS and/or other classical navigation systems. Additionally, logically associated space- and earth-based TFT, QPS, and/or QAI systems can integrate space-, maritime-, and ground-based pitch, yaw, and rotation into the X, Y, and Z axes in order to generate spatial location and/or movement data of respective objects (moving or stationary) and/or points of interest in six degrees of freedom (6D). In an implementation, such location and/or movement data can be generated within a SAGIN environment.

Figure 7:
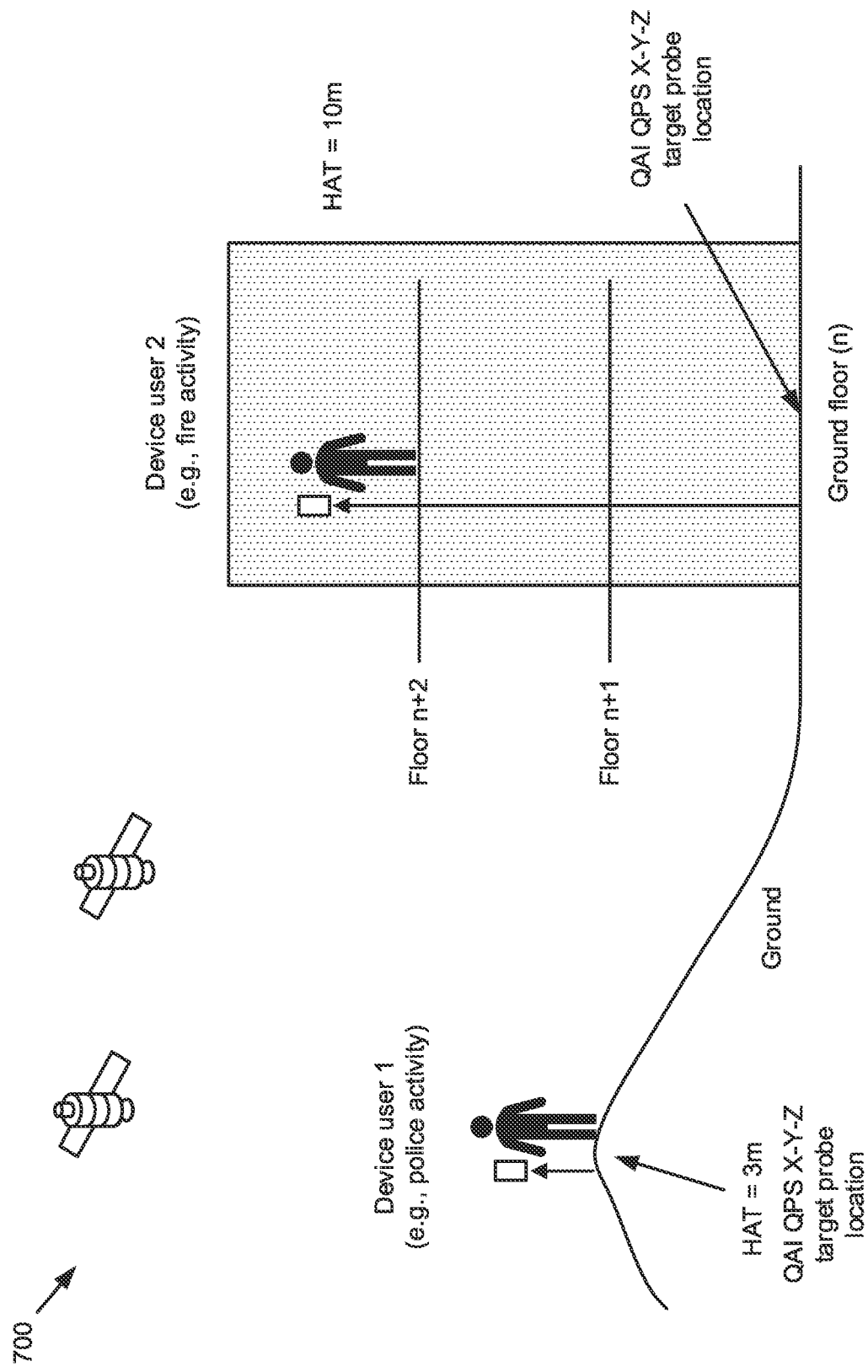
FIG. 7 is a diagram depicting example use cases for quantum satellite-based global networks in accordance with various aspects described herein.

Diagram 700 in FIG. 7 illustrates respective example use cases for quantum positioning in the context of public safety. While diagram 700 illustrates specific examples directed to police activity in an outdoor area and firefighting activity in a multi-story building, it is noted that other examples are also possible. As shown in diagram 700, respective satellites in a geocentric orbit, e.g., LEO, GEO, and/or other orbits, can be utilized in combination with terrestrial assets to locate the three-dimensional position of an object, e.g., a mobile phone or other positioning-enabled device carried by a police officer, firefighter, or other public safety first responder, with reference to a terrain surface.

As further shown by diagram 700, three-dimensional position data as obtained via QPS and/or other systems can be utilized to determine the height above terrain (HAT) of a given device. As shown by the leftmost example in diagram 700, the HAT determined for a given device can be with reference to a defined elevation (e.g., sea level, etc.). Also or alternatively as shown by the rightmost example in diagram 700, the HAT for a device inside a building or other structure can be determined with reference to the base of the structure, e.g., the elevation of the ground floor of the structure. Other examples are also possible.

In an aspect, space-based inertial quantum sensors, e.g., based on atomic interferometry, can provide earth sensing and gravity field mapping (e.g., satellite-based gravimetry) that utilizes coherent quantum matter waves as test masses. In conjunction with AI-driven predictive and prescriptive data analysis (e.g., as described above with respect to FIG. 6), this gravimetry can improve prediction of adverse effects of climate change, earthquakes, floods, droughts, and/or other earth-based events. As a result, systems as described herein can facilitate preemptive public safety readiness and deployment prior to catastrophic events, as distinguished from classical accelerometers that experience relatively increased noise at low frequencies with large long-term drifts.

In another aspect, space-based quantum sensors can capture quantum images and/or audio, i.e., encoding of image and/or audio information within a quantum mechanical system. Quantum edge detection algorithms, combined with QML-based object detection, can provide 2D/3D surveillance capabilities for object identification (e.g., vehicles, buildings, etc.) during public safety emergency or pre-planned events.

Space-to-earth, earth-to-earth, and/or space-to-space communications performed as described herein can be provably secured via the use of entanglement-based quantum key distribution (ENT-QKD) utilizing one or more photon pair sources between the points where keys are generated, enabling the communication of arbitrary quantum states. Also or alternatively, such communications can be provably secured via the use of prepared and measured QKS, such as phase matching QKD (PM-QKD) performed according to the dispersion supported BB84 (DS-BB84) protocol and/or other suitable protocols.

Figure 8:
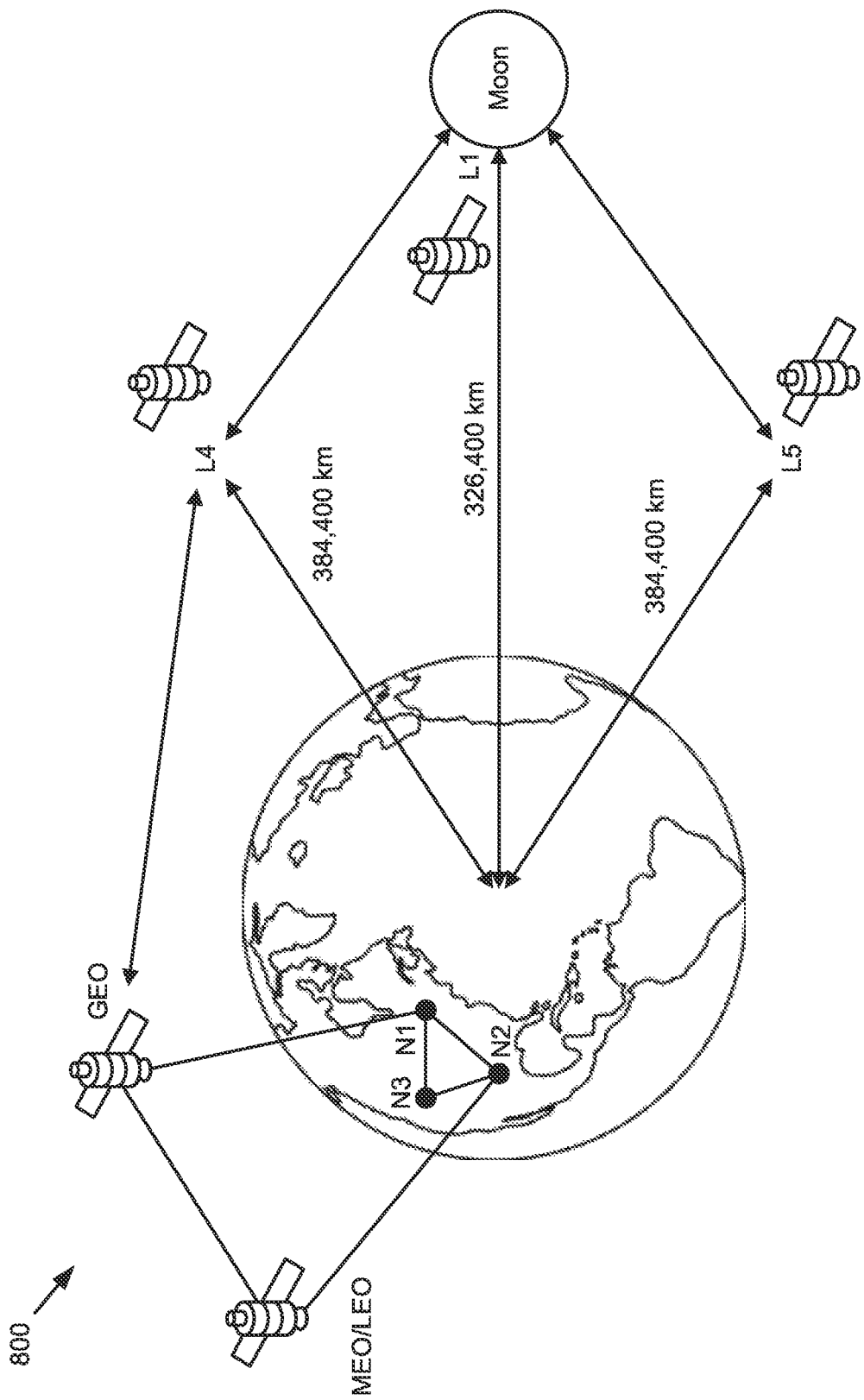
FIG. 8 is a diagram depicting an example positioning technique that can be utilized for a quantum satellite-based global network in accordance with various aspects described herein.

Turning next to FIG. 8, diagram 800 illustrates an implementation in which one or more space-based reference assets (e.g., satellites, servers, routers, switches, hardened chip-based mobile core networks, etc.) can be stationed and/or otherwise positioned at respective earth-lunar Lagrange points ($L_1$-$L_n$, also referred to as equilibrium points or libration points) formulated on the principle of least action, e.g., calculated as a secondary mass m and appearing to an inertial observer to move in circular orbits around $m_1$-$m_n$). In an aspect, Lagrange point-stationed space assets can provide primary and/or secondary accessible storage to global historical data relating to commerce, public safety, or the like, as well as provide primary and/or secondary servers, QAI, and predictive/prescriptive data analytics to anticipated and in-process public safety events. Additionally, the Lagrange point-stationed space assets shown in diagram 800 can exhibit zero velocity and zero acceleration relative to satellite- and ground-based operational assets based on placement, e.g., at the earth-lunar $L_1$, $L_4$, and $L_5$ points shown in diagram 800, with minimal orbital station keeping.

In the example shown in diagram 800, the marked distances associated with Lagrange points $L_1$, $L_4$, and $L_5$ represent the respective distances between said points and the center of the earth. Additionally, points N1, N2, and N3 shown in diagram 800 represent locations of nodes in an earth-based network.

Example network configurations that can be utilized to implement various aspects described herein can be based on a software defined network (SDN), which can include respective virtualized functions implemented on general-purpose hardware, e.g., a general-purpose computing architecture as described below with respect to FIG. 12, to run virtual network elements to support respective terrestrial- and near-earth orbit-based communication services. Each virtual network function (vNF) used in this manner can be given a vNF type that indicates its functionality and/or role.

In an aspect, priority and scheduling for quantum satellite-based and public safety mobile application-specific Quantum Class of Service (QCOS) can be marked with quantum differentiated service code point (QDSCP) values in Quantum Quality of Service (QQoS) configurations. These configurations can encode respective relations between QQoS and Internet Protocol (IP) precedence to prescriptively optimize, e.g., in real time, ETE mobile network logical and physical resources. This can be done, for example, to dynamically allocate, re-allocate, configure, and/or re-configure virtual network elements, e.g., to optimize response to disaster scenarios on the local, regional, national, or global level. Additionally, the above can be performed to guarantee prioritized network access to public safety first responders and to disallow preemption once on the network.

Quantum satellite-based mobile applications as provided herein can include respective application classes, such as transport protocols, conversational, streaming, Voice over Long Term Evolution (VoLTE), Voice over New Radio (VoNR), augmented reality/virtual reality (AR/VR) over NR, tactile networks (e.g., with real-time interaction of visual, audio, and/or haptic data), Operations, Administration and Management (OAM), etc. These application classes can be assigned unique mobility traffic markings and expected QQoS Class Identifier (QQCI)-to-QDSCP marking tables that are specific to mobile network core elements, such as an evolved Node B (eNodeB or eNB), a next generation Node B (gNodeB or gNB), Mobility Management Entity (MME), Session Border Controller (SBC), Security Gateway (SeGW), Proxy-Call Session Control Function (P-CSCF), or the like. Additional traffic markings and/or marking tables can be generated for applications such as Guaranteed Bit Rate (GBR), non-GBR video-type applications, streaming video, push to talk (PTT), enhanced PTT (EPTT), mission critical PTT/video/data (MC-x), etc.

Figure 9:
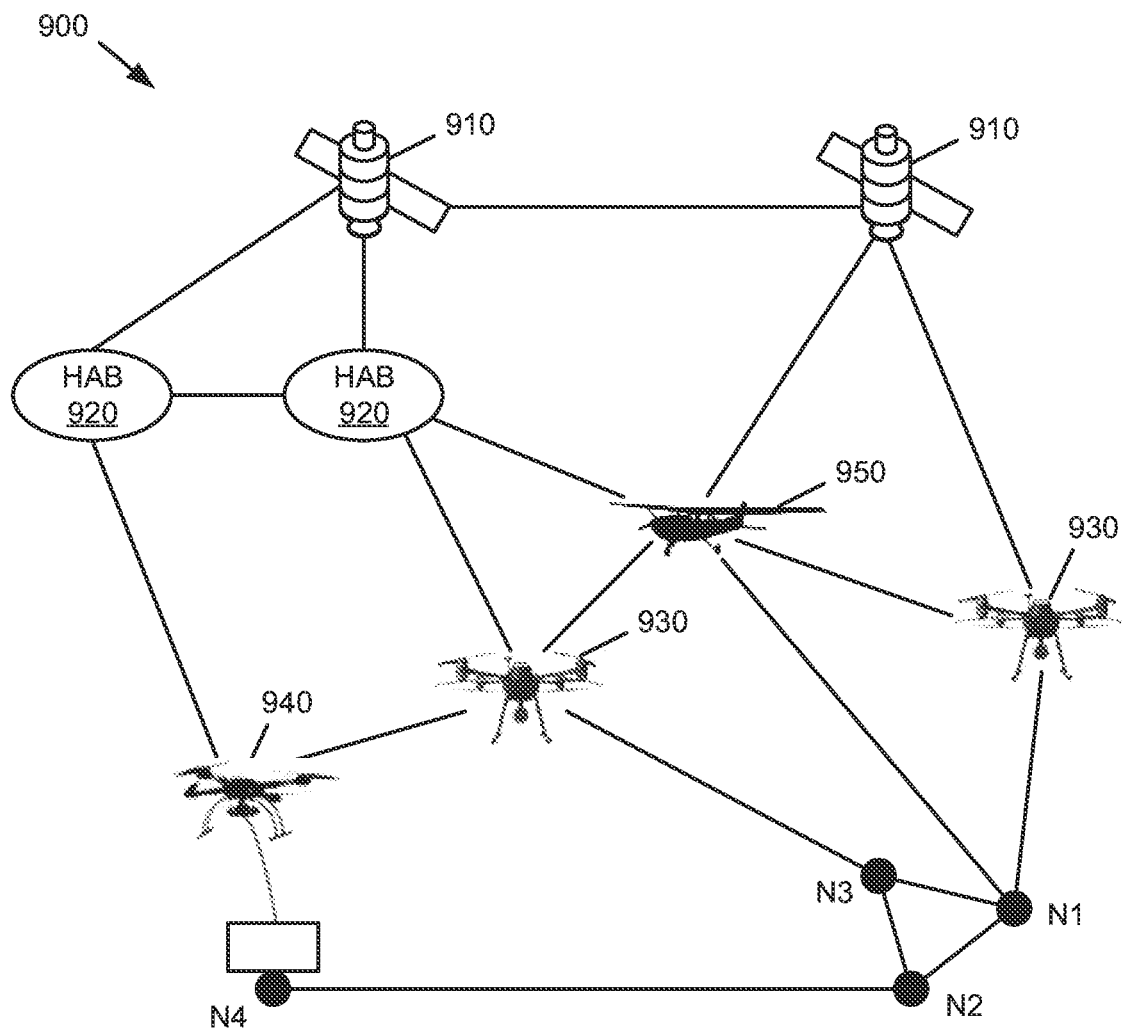
FIGS. 9-10 are diagrams depicting respective multi-altitude networks that can be utilized in accordance with various aspects described herein.

Turning now to FIG. 9, diagram 900 illustrates an example quantum and/or hybrid quantum-classical multi-altitude communication network. The network shown by diagram 900 can enable, e.g., relaying nodes as well as communication channels among network elements such as satellites 910, high altitude balloons (HABs) 920, untethered drones 930, tethered drones 940, aircraft 950, and user equipment devices (UEs). In an aspect, the HABs 920 can operate at any appropriate altitude, e.g., up to stratospheric altitudes, and act as a relay between the satellites 910 and other elements of the network.

The tethered drones 940 shown in diagram 900 can act as a network cell to provide communication service to UEs and/or other nearby devices. The tethered drones 940 can be implemented as a flying Cell on Wings (COW), and can be physically coupled (tethered) to Satellite Cell on Light Truck (SatCOLT) vehicles and/or other suitable tether points. As further shown by diagram 900, a tethered drone 940, and/or a location to which the tethered drone 940 is attached, can function as a network node, e.g., network node N4 shown in diagram 900, in addition to other earth-based network nodes N1-N3.

Figure 10:
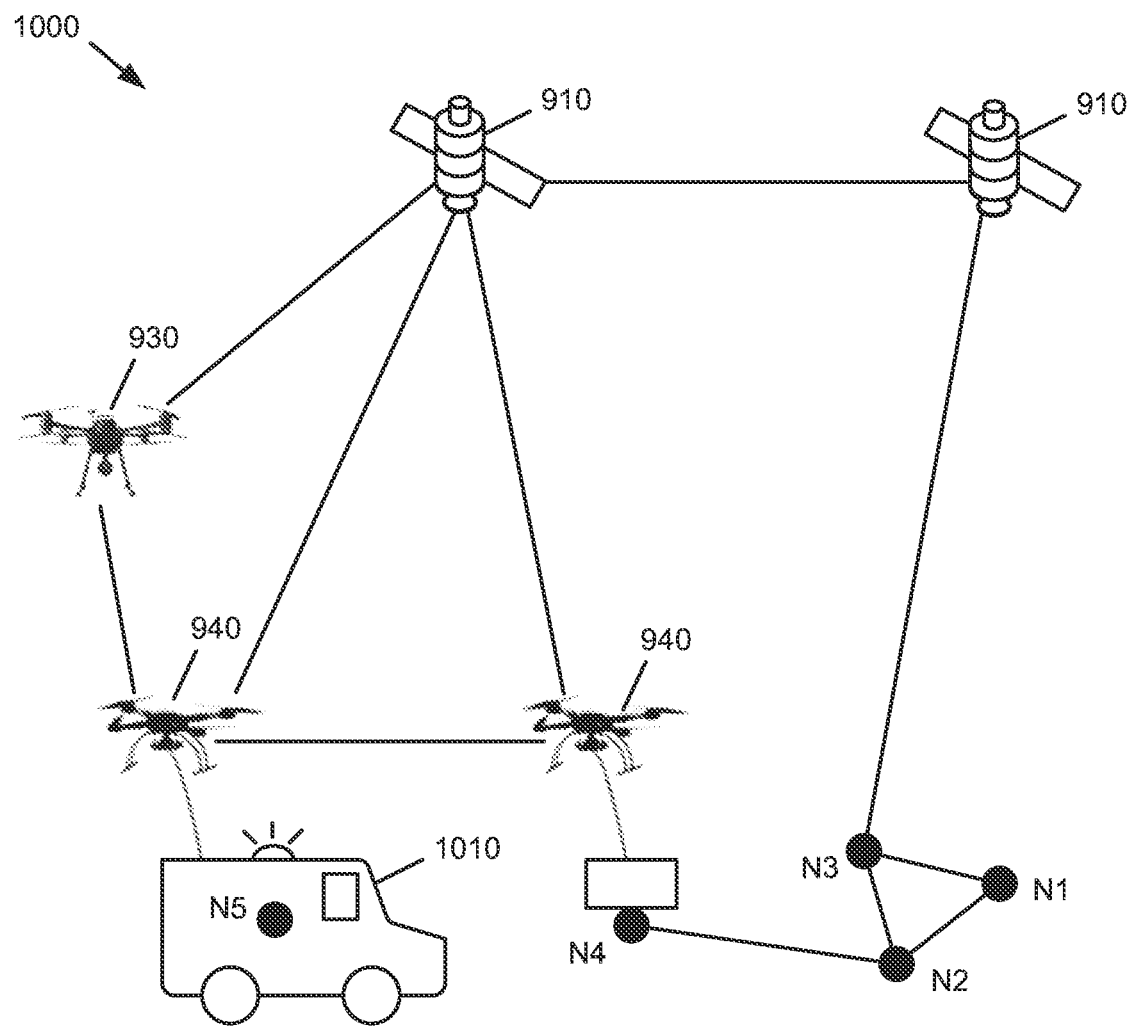

Turning next to FIG. 10, diagram 1000 illustrates an example deployment of a multi-altitude network that can be deployed, e.g., to public safety incidents where and/or when the area is not safe for first responders. Repetitive description of like elements described above with respect to FIG. 9 is omitted for sake of brevity. The example network deployment shown in diagram 1000 includes self-navigating vehicles, such as untethered drones 930 and tethered drones 940. Diagram 1000 further illustrates a tethered drone 940 attached to a vehicle 1010, such as a SatCOLT; a fire truck, ambulance, or other first response vehicle; and/or another suitable vehicle. The vehicle 1010, and/or the tethered drone 940 attached to the vehicle, can also serve as an additional network node N5 to supplement network nodes N1-N4 described above with respect to FIG. 9.

In an aspect, hybrid quantum-classical satellite-based computation, networking, classical AI, and quantum AI as described herein can enable fundamental principles of Explainable AI (XAI) systems to reflect interactions between AI systems and human recipients of output information. These principles can include the following:

(1) Systems deliver accompanying evidence or reasons for output;
(2) Systems provide explanations that are understandable to users;
(3) Explanations correctly reflect the process used by systems to generate a corresponding output; and
(4) The system only operates under conditions for which it was designed or when the system reaches a sufficient confidence level in its output.

In addition, the system XAI, and in particular explainable machine learning, can provide a suite of classical ML and quantum ML techniques that can produce more explainable models while maintaining a high level of learning performance (prediction accuracy) as well as enable human users to understand, appropriately trust, and effectively manage extant and emerging artificially intelligent ecosystem partners.

In another aspect, various implementations here can enable the integration of IoT devices for computation, communication, and/or other functions provided herein. For example, a hybrid quantum-classical satellite-based computing and networking ecosystem can incorporate IoT sensors and components (e.g., light sensors, pressure sensors, temperature sensors, electromagnetic flux sensors, humidity sensors, radiation sensors, chemical sensors, sound sensors, etc.). Space-terrestrial interconnections among respective IoT sensors can include, for example, the following:

(1) Interconnected constellations of space-based LEO-altitude orbital nanosatellites;
(2) Interconnected constellations of space-based MEO-altitude orbital nanosatellites;
(3) A system of interconnected LEO-, MEO-, and/or GEO-altitude nano- and/or larger satellites;
(4) A system of LEO-, MEO-, GEO-altitude nano- and/or larger satellites interconnected with space-based reference assets (e.g., satellites, servers, routers, switches, hardened chip-based mobile core networks) stationed at one or more space-based Lagrange points; and
(5) A system of LEO-/MEO-/GEO-altitude satellites, Lagrange point space-based reference assets, and/or terrestrial IoT sensors.

These IoT-connected space and/or terrestrial assets can enable earth-lunar orbital awareness, e.g., for connected vehicles and/or infrastructure, more energy-efficient smart grids, early warning sensor-based awareness for disasters, etc. These assets can further incorporate rectennas (combinations of antennas and rectifiers/converters) with power management circuitry to amplify voltage while simultaneously operating at negligible power budgets. These IoT assets can further interconnect with and enable IP, Transmission Control Protocol (TCP)/User Datagram Protocol (UDP), Convergence Layer Protocol (CLP), and Bundling Protocol Agent (BPA) HLAPIs and LLAPIs to and/or from a deep space network (DSN) via GEO orbital assets to communicate sensor classification, identification, and status information. Additionally, space-earth interconnected IoT sensors can drive QAI-driven data analytics on collected data to include, e.g., predictive and/or prescriptive analytics as described above with respect to FIG. 6. Moreover, space-earth-based IoT assets can be provably secure, e.g., via use of ENT-QKD and/or PM-QKD.

Figure 11:
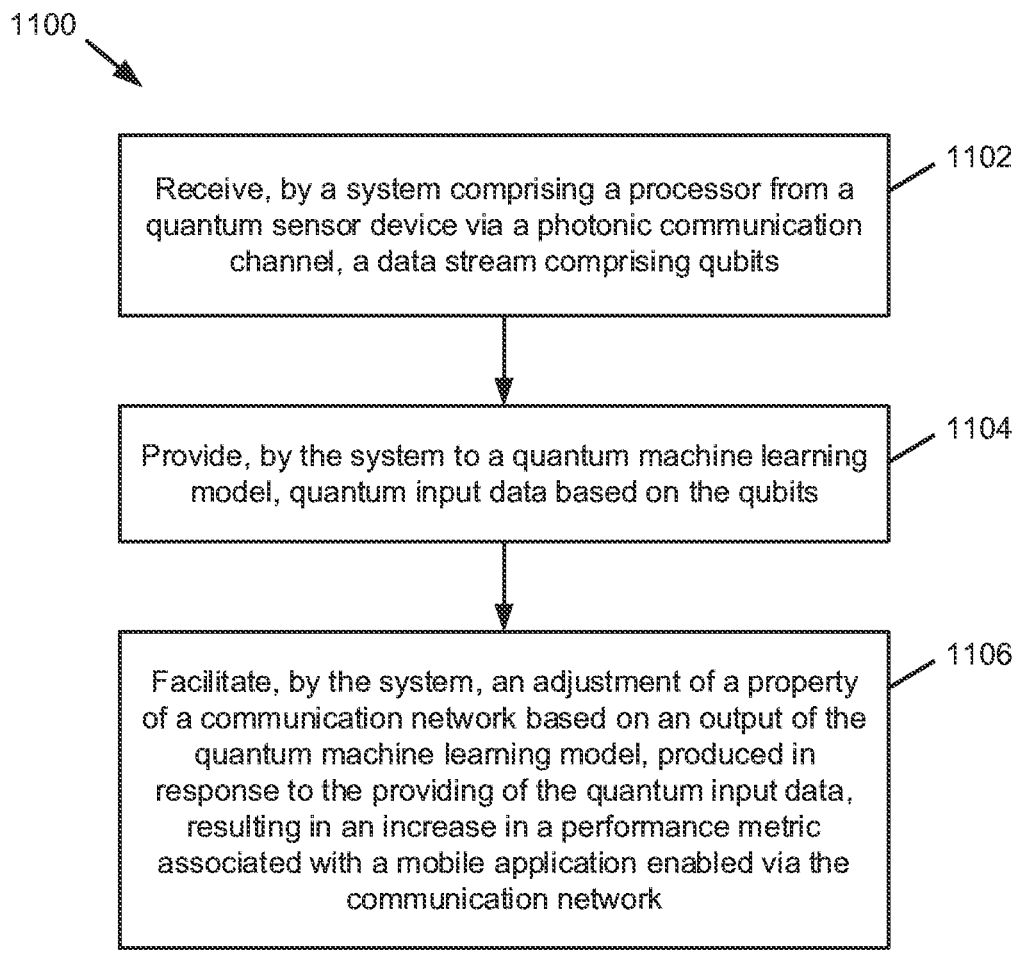
FIG. 11 is a flow diagram of a method that facilitates quantum satellite-based global networks in accordance with various aspects described herein.

With reference now to FIG. 11, a flow diagram of a method 1100 that facilitates quantum satellite-based global networks is presented. At 1102, a system comprising a processor (e.g., a quantum network management device 10 comprising a processor 12, and/or a system including such a device) can receive (e.g., by a quantum transceiver component 210 and/or other components implemented by the processor 12), from a quantum sensor device (e.g., a quantum sensor device 20) via a photonic communication channel (e.g., a quantum communication channel 40), a data stream comprising qubits.

At 1104, the system can provide (e.g., by an input processing component 220 and/or other components implemented by the processor 12) quantum input data based on the qubits received at 1102 to a QML model (e.g., a QML model 50).

At 1106, the system can facilitate (e.g., by a network adjustment component 230 and/or other components implemented by the processor 12) an adjustment of a property of a communication network (e.g., a communication network comprising network devices 30) based on an output of the QML model that is produced in response to providing the quantum input data to the QML model at 1104. As a result of this adjustment, an increase in a performance metric associated with a mobile application enabled via the communication network can be realized.

FIG. 11 illustrates a method in accordance with certain aspects of this disclosure. While, for purposes of simplicity of explanation, the method is shown and described as a series of acts, it is noted that this disclosure is not limited by the order of acts, as some acts may occur in different orders and/or concurrently with other acts from that shown and described herein. For example, those skilled in the art will understand and appreciate that methods can alternatively be represented as a series of interrelated states or events, such as in a state diagram. Moreover, not all illustrated acts may be required to implement methods in accordance with certain aspects of this disclosure.

Figure 12:
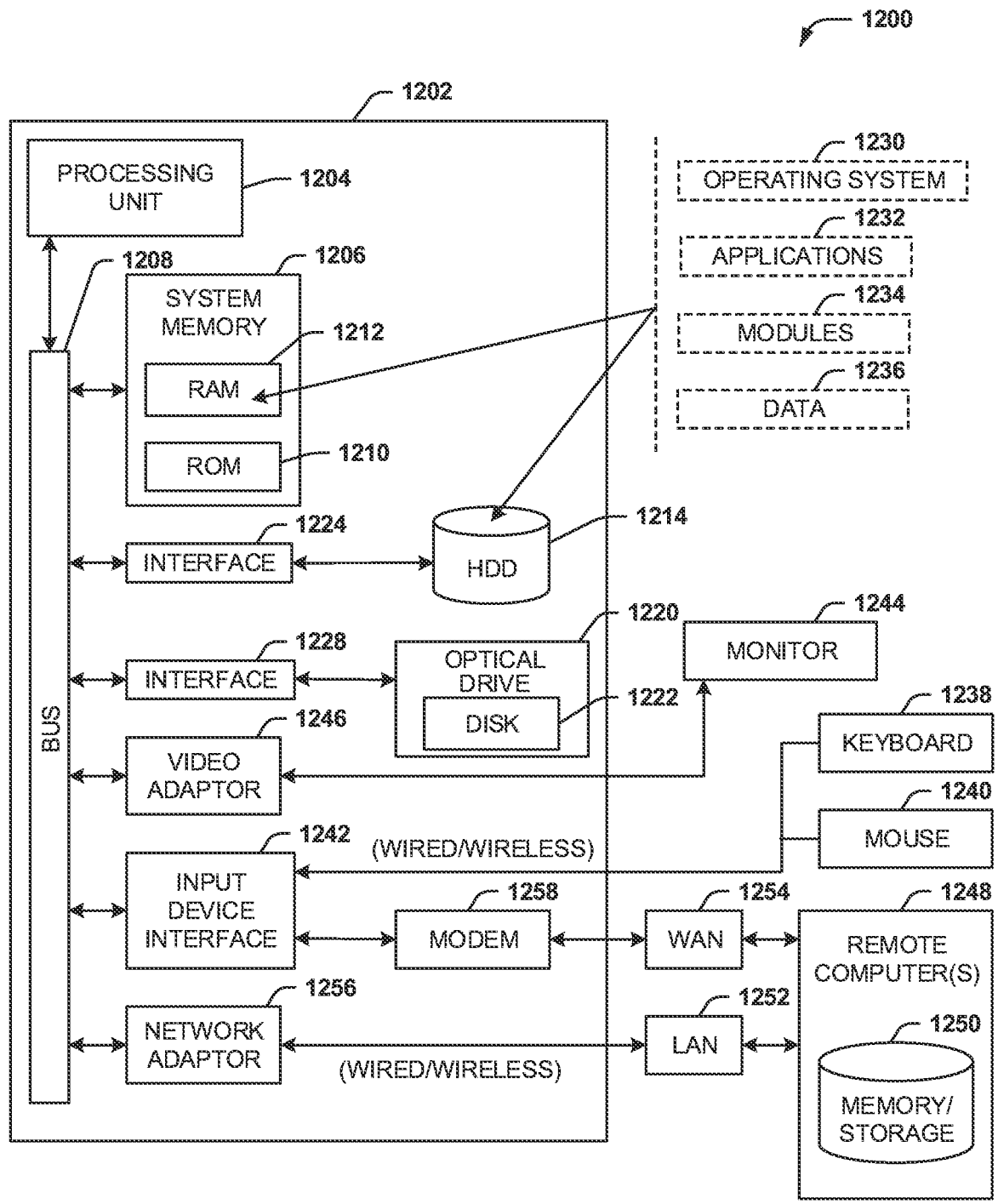
FIG. 12 depicts an example computing environment in which various embodiments described herein can function.

In order to provide additional context for various embodiments described herein, FIG. 12 and the following discussion are intended to provide a brief, general description of a suitable computing environment 1200 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media and/or communications media, which two terms are used herein differently from one another as follows. Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 12, the example environment 1200 for implementing various embodiments of the aspects described herein includes a computer 1202, the computer 1202 including a processing unit 1204, a system memory 1206 and a system bus 1208. The system bus 1208 couples system components including, but not limited to, the system memory 1206 to the processing unit 1204. The processing unit 1204 can be any of various commercially available processors. Dual microprocessors and other multi-processor architectures can also be employed as the processing unit 1204.

The system bus 1208 can be any of several types of bus structure that can further interconnect to a memory bus (with or without a memory controller), a peripheral bus, and a local bus using any of a variety of commercially available bus architectures. The system memory 1206 includes ROM 1210 and RAM 1212. A basic input/output system (BIOS) can be stored in a non-volatile memory such as ROM, erasable programmable read only memory (EPROM), EEPROM, which BIOS contains the basic routines that help to transfer information between elements within the computer 1202, such as during startup. The RAM 1212 can also include a high-speed RAM such as static RAM for caching data.

The computer 1202 further includes an internal hard disk drive (HDD) 1214 and an optical disk drive 1220, (e.g., which can read or write from a CD-ROM disc, a DVD, a BD, etc.). While the internal HDD 1214 is illustrated as located within the computer 1202, the internal HDD 1214 can also be configured for external use in a suitable chassis (not shown). Additionally, while not shown in environment 1200, a solid state drive (SSD) could be used in addition to, or in place of, an HDD 1214. The HDD 1214 and optical disk drive 1220 can be connected to the system bus 1208 by an HDD interface 1224 and an optical drive interface 1228, respectively. The HDD interface 1224 can additionally support external drive implementations via Universal Serial Bus (USB), Institute of Electrical and Electronics Engineers (IEEE) 1394, and/or other interface technologies. Other external drive connection technologies are within contemplation of the embodiments described herein.

The drives and their associated computer-readable storage media provide nonvolatile storage of data, data structures, computer-executable instructions, and so forth. For the computer 1202, the drives and storage media accommodate the storage of any data in a suitable digital format. Although the description of computer-readable storage media above refers to respective types of storage devices, it is noted by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1212, including an operating system 1230, one or more application programs 1232, other program modules 1234 and program data 1236. All or portions of the operating system, applications, modules, and/or data can also be cached in the RAM 1212. The systems and methods described herein can be implemented utilizing various commercially available operating systems or combinations of operating systems.

A user can enter commands and information into the computer 1202 through one or more wired/wireless input devices, e.g., a keyboard 1238 and a pointing device, such as a mouse 1240. Other input devices (not shown) can include a microphone, an infrared (IR) remote control, a joystick, a game pad, a stylus pen, touch screen or the like. These and other input devices are often connected to the processing unit 1204 through an input device interface 1242 that can be coupled to the system bus 1208, but can be connected by other interfaces, such as a parallel port, an IEEE 1394 serial port, a game port, a USB port, an IR interface, a BLUETOOTH® interface, etc.

A monitor 1244 or other type of display device can be also connected to the system bus 1208 via an interface, such as a video adapter 1246. In addition to the monitor 1244, a computer typically includes other peripheral output devices (not shown), such as speakers, printers, etc.

The computer 1202 can operate in a networked environment using logical connections via wired and/or wireless communications to one or more remote computers, such as a remote computer(s) 1248. The remote computer(s) 1248 can be a workstation, a server computer, a router, a personal computer, portable computer, microprocessor-based entertainment appliance, a peer device or other common network node, and typically includes many or all of the elements described relative to the computer 1202, although, for purposes of brevity, only a memory/storage device 1250 is illustrated. The logical connections depicted include wired/wireless connectivity to a local area network (LAN) 1252 and/or larger networks, e.g., a wide area network (WAN) 1254. Such LAN and WAN networking environments are commonplace in offices and companies, and facilitate enterprise-wide computer networks, such as intranets, all of which can connect to a global communications network, e.g., the Internet.

When used in a LAN networking environment, the computer 1202 can be connected to the local network 1252 through a wired and/or wireless communication network interface or adapter 1256. The adapter 1256 can facilitate wired or wireless communication to the LAN 1252, which can also include a wireless access point (AP) disposed thereon for communicating with the wireless adapter 1256.

When used in a WAN networking environment, the computer 1202 can include a modem 1258 or can be connected to a communications server on the WAN 1254 or has other means for establishing communications over the WAN 1254, such as by way of the Internet. The modem 1258, which can be internal or external and a wired or wireless device, can be connected to the system bus 1208 via the input device interface 1242. In a networked environment, program modules depicted relative to the computer 1202 or portions thereof, can be stored in the remote memory/storage device 1250. It will be appreciated that the network connections shown are example and other means of establishing a communications link between the computers can be used.

The computer 1202 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can include Wireless Fidelity (Wi-Fi) and BLUETOOTH® wireless technologies. Thus, the communication can be a predefined structure as with a conventional network or simply an ad hoc communication between at least two devices.

The above description includes non-limiting examples of the various embodiments. It is, of course, not possible to describe every conceivable combination of components or methodologies for purposes of describing the disclosed subject matter, and one skilled in the art may recognize that further combinations and permutations of the various embodiments are possible. The disclosed subject matter is intended to embrace all such alterations, modifications, and variations that fall within the spirit and scope of the appended claims.

With regard to the various functions performed by the above described components, devices, circuits, systems, etc., the terms (including a reference to a "means") used to describe such components are intended to also include, unless otherwise indicated, any structure(s) which performs the specified function of the described component (e.g., a functional equivalent), even if not structurally equivalent to the disclosed structure. In addition, while a particular feature of the disclosed subject matter may have been disclosed with respect to only one of several implementations, such feature may be combined with one or more other features of the other implementations as may be desired and advantageous for any given or particular application.

The terms "exemplary" and/or "demonstrative" as used herein are intended to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent structures and techniques known to one skilled in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

The term "or" as used herein is intended to mean an inclusive "or" rather than an exclusive "or." For example, the phrase "A or B" is intended to include instances of A, B, and both A and B. Additionally, the articles "a" and "an" as used in this application and the appended claims should generally be construed to mean "one or more" unless either otherwise specified or clear from the context to be directed to a singular form.

The term "set" as employed herein excludes the empty set, i.e., the set with no elements therein. Thus, a "set" in the subject disclosure includes one or more elements or entities. Likewise, the term "group" as utilized herein refers to a collection of one or more entities.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

The description of illustrated embodiments of the subject disclosure as provided herein, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as one skilled in the art can recognize. In this regard, while the subject matter has been described herein in connection with various embodiments and corresponding drawings, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A system, comprising:
   a processor; and
   a memory that stores first executable instructions that, when executed by the processor, facilitate performance of operations, comprising:
      receiving qubits from a quantum sensor device via a quantum communication channel established between the system and the quantum sensor device;
      providing quantum input data, derived from the qubits, to a quantum machine learning model; and
      adjusting a property of a communication network based on an output of the quantum machine learning model, produced in response to the providing of the quantum input data, resulting in an increased performance of a mobile application utilizing resources enabled via the communication network.

2. The system of claim 1, wherein the adjusting comprises generating recommendation data by performing a prescriptive analytical function on the output of the quantum machine learning model and providing the recommendation data to the communication network via an application programming interface.

3. The system of claim 1, wherein the quantum communication channel is a first communication channel, and wherein the operations further comprise:
   receiving binary data via a second communication channel that is distinct from the first communication channel; and
   generating the quantum input data based on the qubits and the binary data.

4. The system of claim 1, wherein the quantum sensor device is associated with a satellite traveling in a geocentric orbit.

5. The system of claim 4, wherein the satellite is positioned at an earth-lunar Lagrange point.

6. The system of claim 1, wherein the quantum sensor device comprises a device selected from a group of devices comprising a quantum gyroscope, a quantum interferometer, and a quantum accelerometer.

7. The system of claim 1, wherein the quantum sensor device is an Internet of Things device.

8. The system of claim 1, wherein the quantum communication channel utilizes a channel feature selected from a group comprising quantum channel encoding and quantum error detection.

9. The system of claim 1, wherein the quantum input data represents a three-dimensional position of a network device, on which the mobile application is running, with reference to a terrain surface.

10. The system of claim 1, wherein the communication network is FirstNet, and wherein the mobile application is a public safety mobile application.

11. A method, comprising:
    receiving, by a system comprising a processor from a quantum sensor device via a photonic communication channel, a data stream comprising qubits;
    providing, by the system to a quantum machine learning model, quantum input data based on the qubits; and
    facilitating, by the system, an adjustment of a property of a communication network based on an output of the quantum machine learning model, produced in response to the providing of the quantum input data, resulting in an increase in a performance metric associated with a mobile application enabled via the communication network.

12. The method of claim 11, wherein the facilitating of the adjustment comprises:
    performing a prescriptive analytical function on the output of the quantum machine learning model, resulting in prescriptive analytics data; and
    providing the prescriptive analytics data to the communication network via an application programming interface.

13. The method of claim 11, wherein the data stream is a first data stream, and wherein the method further comprises:
    receiving, by the system via a non-photonic communication channel, a second data stream comprising binary data; and
    generating, by the system, the quantum input data based on the qubits and the binary data.

14. The method of claim 11, wherein the quantum sensor device is associated with a satellite traveling in a geocentric orbit.

15. The method of claim 11, wherein the quantum sensor device is an Internet of Things device.

16. The method of claim 11, wherein the quantum input data represents a three-dimensional position of a mobile device, running the mobile application via the communication network, with reference to a terrain surface.

17. A non-transitory machine-readable medium, comprising executable instructions that, when executed by a processor, facilitate performance of operations, comprising:
    receiving, from a quantum sensor via a quantum communication channel, quantum sensor measurement data;
    deriving model input data from the quantum sensor measurement data;

providing the model input data to a quantum machine learning model; and modifying a property of a communication network based on an output of the quantum machine learning model, produced in response to the model input data, wherein the modifying of the property of the communication network results in increased performance of a mobile application utilizing resources associated with the communication network.

18. The non-transitory machine-readable medium of claim 17, wherein the modifying comprises:

generating recommendation data by performing a prescriptive analytical function on the output of the quantum machine learning model; and conveying the recommendation data to network equipment of the communication network via an application programming interface.

19. The non-transitory machine-readable medium of claim 17, wherein the operations further comprise:

receiving, via a non-photonic communication channel, supplemental input data that is distinct from the quantum sensor measurement data, wherein the deriving of the model input data, comprises deriving the model input data based on the quantum sensor measurement data and the supplemental input data.

20. The non-transitory machine-readable medium of claim 17, wherein the quantum sensor measurement data relates to a three-dimensional position of a mobile device, on which the mobile application is executing, with reference to a terrain surface.

* * * * *